(12) United States Patent
Matsuda

(10) Patent No.: US 6,813,442 B2
(45) Date of Patent: Nov. 2, 2004

(54) AUTOFOCUS SYSTEM AND CAMERA SYSTEM

(75) Inventor: Takaho Matsuda, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/871,639

(22) Filed: Jun. 4, 2001

(65) Prior Publication Data

US 2002/0039489 A1 Apr. 4, 2002

(30) Foreign Application Priority Data

Jun. 8, 2000 (JP) .......................................... 2000-171357
Aug. 3, 2000 (JP) .......................................... 2000-235065

(51) Int. Cl.[7] .............................. G03B 13/22; G03B 3/00
(52) U.S. Cl. ................................................ 396/91; 396/93
(58) Field of Search ........................... 396/89, 91, 93, 396/104, 102; 348/342

(56) References Cited

U.S. PATENT DOCUMENTS

| | | | | |
|---|---|---|---|---|
| 4,931,820 A | * | 6/1990 | Matsuzawa et al. | ........... 396/93 |
| 5,630,180 A | * | 5/1997 | Kusaka | ........................ 396/63 |
| 6,088,537 A | * | 7/2000 | Ohtaka et al. | ................ 396/81 |
| 6,097,897 A | * | 8/2000 | Ide | .............................. 396/104 |

* cited by examiner

*Primary Examiner*—Rodney Fuller
*Assistant Examiner*—Arthur A Smith
(74) *Attorney, Agent, or Firm*—Fitzpatrick, Cella, Harper & Scinto

(57) ABSTRACT

In a lens-interchangeable digital single-lens reflex camera having a focus detection device, an autofocus device corrects a focus detection result by storing, on the camera side, the detection result obtained by a focus detection means and the deviation of the best imaging position of an image formed on an image taking element due to a low-pass filter inserted in front of the image taking element.

22 Claims, 8 Drawing Sheets

AUTOFOCUS SYSTEM AND CAMERA SYSTEM

BACKGROUND OF THE INVENTION

1. Field of the Invention

The present invention relates to a camera system having a focus detection device and, more particularly, to a lens-interchangeable digital single-lens reflex camera system having the focus detection device.

2. Related Background Art

FIG. 2 is a block diagram showing the main part of focus detection operation in a conventional lens-interchangeable silver halide film camera. Referring to FIG. 2, a lens body 1 includes an image taking optical system. The lens body 1 incorporates an image taking optical system 2 that is formed by one or a plurality of lens groups and can change the focal length by moving all or some of the lens groups, a lens state detection means 37 for detecting the focal length, i.e., the zoom state, of the image taking optical system 2, a driving means 3 for adjusting the focus state of the image taking lens 1 by moving all or some of the lenses forming the image taking optical system 2, a storage means 4 such as a ROM, and a lens control means 5 for controlling these components. In this case, the lens state detection means 37 detects the movement state of a lens or an amount that characterizes the movement state of the lens that moves to change the focal length (zoom state) of the image taking optical system 2 by a known method, e.g., using an electrode for an encoder which is provided for a lens barrel that rotates or moves to change the focal length of the image taking optical system 2, an electrode for detection which is in contact with the electrode for the encoder, and the like.

A camera (camera body) 6 incorporates a main mirror 7, a focusing screen 8 on which an object image is formed, a pentaprism 9 for image reversal, and an eyepiece lens 10. These elements constitute a finder system. This camera also includes a sub-mirror 11, a focus detection means 12, a computation means 13, a camera control means 14, and a film 15 serving as an image taking medium. The lens 1 and camera body 6 have contacts 16. While the lens 1 and camera body 6 are attached to each other, communication of various information and supply of power are performed through the contacts 16.

FIG. 13 is a view showing the focus detection means 12 having a plurality of focus detection points.

Referring to FIG. 13, a field mask 116 has a crucial aperture portion 116-1 in the center and vertically elongated aperture portions 116-2 and 116-3 in peripheral portions on two sides of the aperture portion 116-1. A field lens 117 is made up of three portions 117-1, 117-2, and 117-3 in correspondence with the three apertures 116-1, 116-2, and 116-3 of the field mask. A stop (aperture) 118 has an aperture portion 118-1 in the central portion. The aperture portion 118-1 has a total of four apertures 118-1a, 118-1b, 118-1c, and 118-1d located at upper, lower, left, and right positions each. In addition, two aperture portions 118-2 and 118-3 are respectively formed in the left and right peripheral portions of the stop 118. The areas 117-1, 117-2, and 117-3 of the field lens 117 respectively have the effects of imaging these aperture portions 118-1, 118-2, and 118-3 on portions near the exit pupil of an image taking optical system (not shown). An optical member 119 is an integral secondary imaging system made up of four pairs of lenses 119-1a and 119-1b, 119-c and 119-1d, 119-2a and 119-2b, and 119-3a and 119-3b, a total of eight lenses. These lenses are arranged behind the respective apertures of the stop 118. A photoelectric conversion element 120 is constituted by four pairs of sensor arrays 120-1a and 120-1b, 120-1c and 120-1d, 120-2a and 120-2b, and 120-3a and 120-3b, a total of eight sensor arrays. These sensor arrays are arranged in correspondence with the respective lenses of the secondary imaging system to receive image light beams from the lenses.

FIG. 14 shows how an object image is formed on the photoelectric conversion element 120. After light beams transmitted through the central aperture portion 116-1 of the field mask 116 and the central portion 117-1 of the field lens 117 are partially selected by the apertures 118-1a, 118-1b, 118-1c, and 118-1d of the stop, image areas 121-1a, 121-1b, 121-1c, and 121-1d are formed on the photoelectric conversion element 120 by the lenses 119-1a, 119-1b, 119-c, and 119-d of the secondary imaging system 119 located behind the apertures. After light beams transmitted through the peripheral aperture portion 116-3 of the field mask 116 and the peripheral portion 117-3 of the field lens 117 are partially selected by the apertures 118-3a and 118-3b of the stop 118, image areas 121-2a and 121-2b are formed on the photoelectric conversion element 120 by the lenses 119-3a and 119-3b of the secondary imaging system 119 located behind the apertures. The focus detection principle of the focus detection means shown in FIG. 13 is generally called a phase difference detection scheme. When the imaging point of the image taking optical system 2 is located in front of an expected focal plane, i.e., on the image taking optical system 2 side, light amount distributions associated with object images formed on a pair of sensor arrays come close to each other. In contrast to this, when the imaging point of the image taking optical system 2 is located behind the expected focal plane, i.e., on the opposite side to the image taking optical system 2, light amount distributions associated with object images formed on the pair of sensor arrays separate from each other. The offset amount between the light amount distributions associated with object images formed on a pair of sensor arrays has a function relationship with the defocus amount of the image taking optical system 2, i.e., the focus deviation amount. If, therefore, the offset amount is calculated by a proper computation means, the direction and amount of focus deviation of the image taking optical system 2 can be detected. Assume that these focus detection means are used for a camera capable of interchanging image taking lenses such as a single-lens reflex camera. In this case, however, if a lens is controlled on the basis of a focus state detection signal associated with a focus deviation amount which is directly obtained from the focus detection means, a proper focus state may not be obtained. The main reason for this is that an image taking optical system for forming an image to be observed or taken and a focus detection means generally receive different light beams. In addition, the focus detection means based on the phase difference detection scheme obtains a focal position or focus deviation amount to be determined on the basis of the amount of aberration in the vertical (optical axis) direction upon converting it into an image deviation associated with aberration in the horizontal direction. For this reason, when aberration occurs in the image taking optical system, the two values may differ from each other depending on the aberration correction state.

To solve this problem, a correction means is provided to correct a focus detection signal D representing a focus deviation amount by $$D_C = D - C \quad (1)$$

using a unique correction value C for each image taking lens, and the driving means 3 is used to drive the image taking optical system entirely or partly on the basis of an obtained correction focus detection signal $D_C$, thereby controlling the lens to match the best imaging position with respect to the film surface. In this case, the best imaging position is the peak position of an MTF corresponding to an on-axis spatial frequency of 30 lines/mm.

FIG. 3 shows a conventional lens-interchangeable digital single-lens reflex camera. Most conventional lens-interchangeable digital single-lens reflex cameras use the bodies of silver halide single-lens reflex cameras, and hence the arrangement in FIG. 3 is almost the same as that in FIG. 2. In a digital single-lens reflex camera, however, an image taking element such as a CCD is used as an image taking plane 15 in place of a film. In addition, an optical member 40 such as a low-pass filter is interposed between the image taking optical system and the image taking element to prevent moire caused by sampling in the image taking element. Focus detection operation in such a lens-interchangeable digital single-lens reflex camera is the same as the above focus detection operation.

If, however, such focus detection operation is performed in a digital single-lens reflex camera, since a light beam guided to the focus detection device does not pass through optical members such as the low-pass filter and the cover glass of the image taking element, this light beam differs from a light beam that is guided to the image taking element and passes through the low-pass filter and the cover glass of the image taking element. For this reason, the best imaging position detected by the focus detection device deviates from the best imaging position on the image taking plane side.

FIG. 4 shows this state, i.e., the imaged state on the optical axis. FIG. 4 shows an image taking optical system 141 and an optical member 142 such as a low-pass filter. If the optical member is not used, focus detection operation is performed by the above focus detection device, and a lens is controlled to match a best imaging position 144 to an image taking plane 143 by an operation for correcting them. However, since the optical member 142 such as a low-pass filter is placed between the image taking optical system and the image taking element, a ray of light that should form an image on the image taking plane 143 is refracted at an incident or emergence surface of the optical member 142, and the best imaging position 144 changes to a best imaging position 145. In a digital single-lens reflex camera using the body of a conventional silver halide single-lens reflex camera, however, a change in the best imaging position due to the optical member cannot be detected and corrected in focus detection operation. If a lens is controlled on the basis of the information of the best imaging position detected by the focus detection device, the image taking plane does not coincide with the best imaging position.

The problem in the prior art described above is associated with an error in focus detection due to a change in the best imaging position of a light beam which forms an on-axis image. The same problem arises when focus detection is performed for a light beam which forms an off-axis image.

SUMMARY OF THE INVENTION

The present invention has been made in consideration of the above situation, and has as its object to provide a focus detection device capable of obtaining a proper focus detection state in a digital single-lens reflex camera having a focus detection device having a single or a plurality of focus detection points, and a camera system using the focus detection device.

In order to solve the above problem, according to the present invention, a lens-interchangeable single-lens reflex camera system includes a focus detection means for obtaining a signal associated with the focus state of the image taking optical system with respect to a predetermined area on the expected focal plane of the image taking optical system, and an optical member (low-pass filter) located between an image taking element and the image taking optical system, and a camera unit has a storage means for storing correction data for correcting the difference between the best imaging position and the detection result obtained by the focus detection means which is caused by the optical member, so that a change in best imaging position at each focus detection point is corrected on the basis of the correction data stored in the storage means.

Other objects, features and advantages of the invention will become apparent from the following detailed description taken in conjunction with the accompanying drawings.

DETAILED DESCRIPTION OF THE PREFERRED EMBODIMENT

Figure 1:
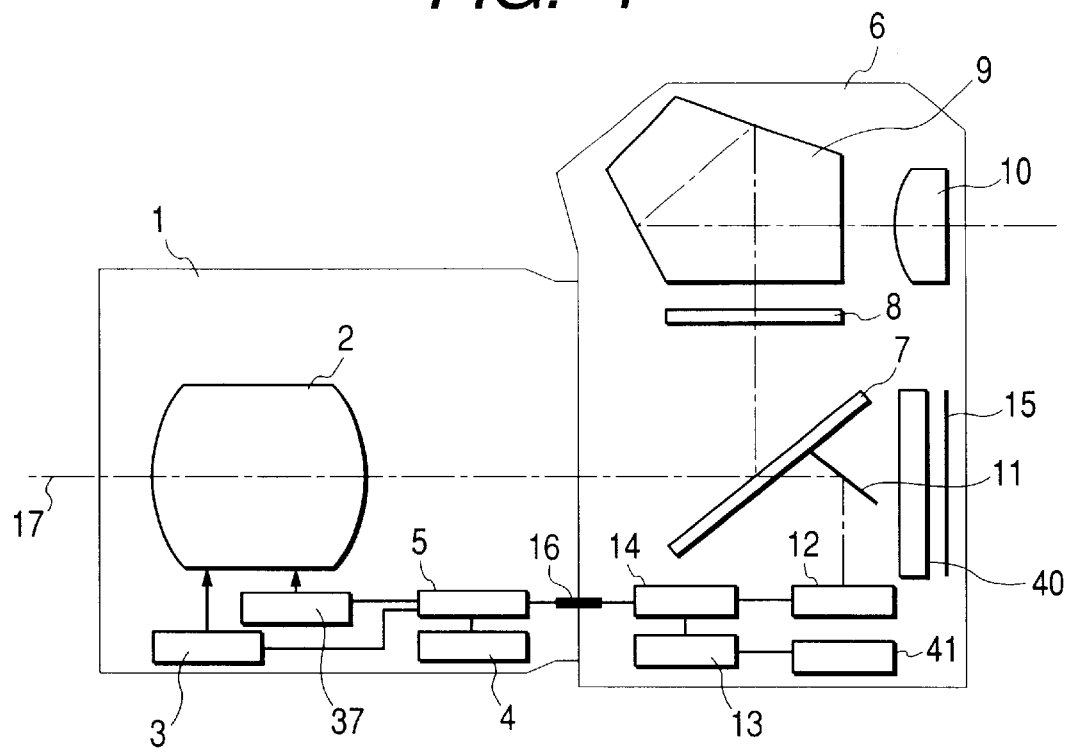
FIG. 1 is a view showing an embodiment of the present invention.

FIG. 1 is a block diagram showing the main part of an embodiment of the present invention to explain the operation of a photographing or image taking apparatus including a focus detection device. Referring to FIG. 1, a lens body 1 has an image taking optical system as an objective lens. This lens body 1 incorporates an image taking optical system 2 which is formed by one or a plurality of lenses and can change the focal length by moving all or some of the lenses, a lens state detection means 37 for detecting the focal length, i.e., the zoom state, of the image taking optical system 2, a driving means 3 for adjusting the focus state of the image taking lens 1 by moving all or some of the lenses constituting the image taking optical system 2, a storage means 4 such as a ROM, and a lens control means 5 for controlling these components.

In this case, the lens state detection means 37 detects the movement state of a lens or an amount that characterizes the movement state of the lens that moves to change the focal length (zoom state) of the image taking optical system 2 by a known method, e.g., using an electrode for an encoder which is provided for a lens barrel that rotates or moves to change the focal length of the image taking optical system 2, an electrode for detection which is in contact with the electrode for the encoder, and the like. A camera body 6 incorporates a main mirror 7, a focusing screen 8 on which an object image is formed, a pentaprism 9 for image reversal, and an eyepiece lens 10. These elements constitute a finder system. This camera also includes a sub-mirror 11, a focus detection means 12, computation means 13, and a camera control means 14. The lens 1 and camera body 6 have contacts 16. While the lens 1 and camera body 6 are attached to each other, communication of various information and supply of power are performed through the contacts 16.

Figure 5:
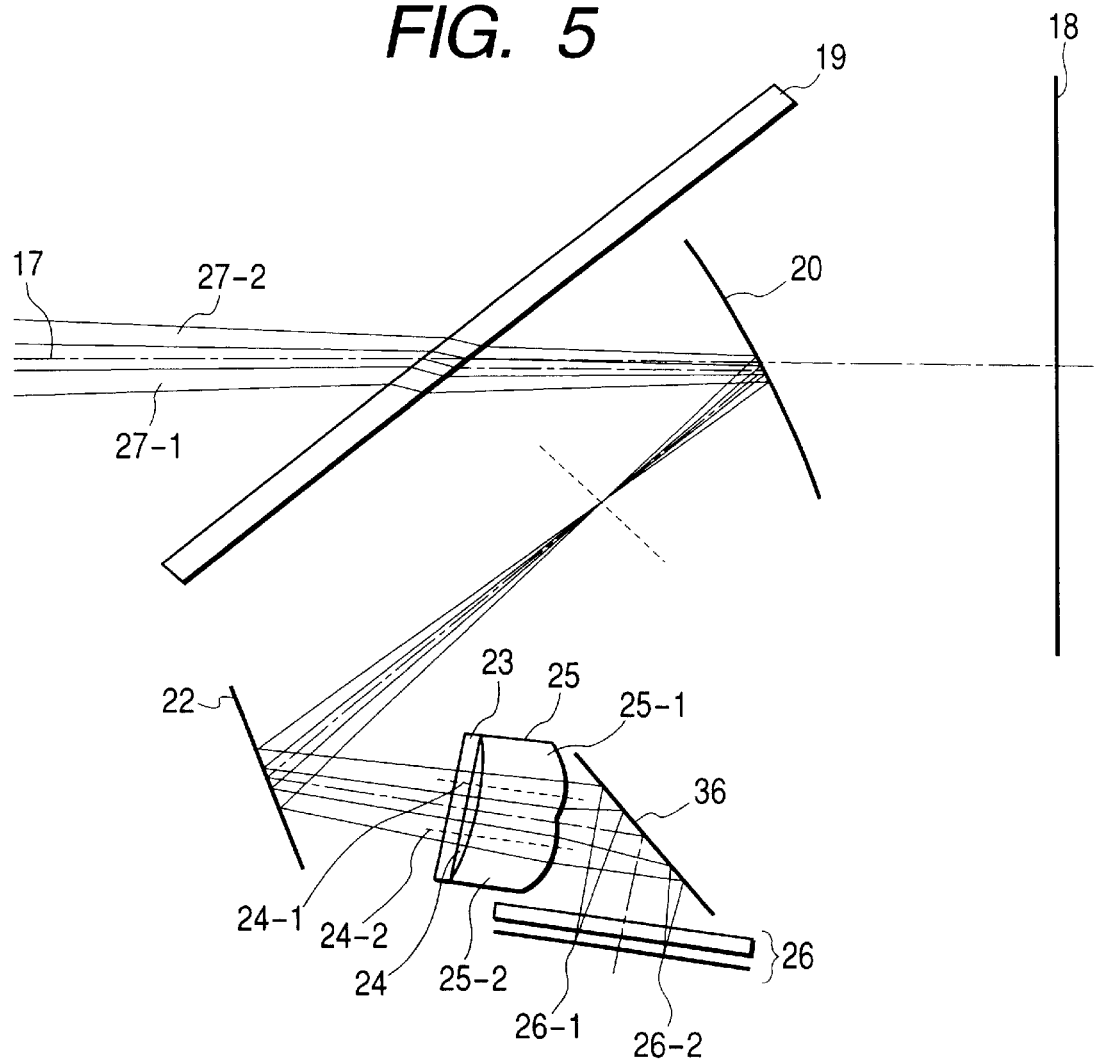
FIG. 5 is a view showing the arrangement of a focus detection means to which the embodiment of the present invention is applied.

FIG. 5 is a view for explaining the detailed arrangement of elements associated with the focus detection means 12 in FIG. 1. Referring to FIG. 5, the view designates an optical axis 17 of the image taking system, an image taking plane 18 equivalent to an image taking plane 15 in FIG. 1, a semi-transparent main mirror 19 equivalent to the main mirror 7 in FIG. 1 which is placed on the optical axis 17 of the image taking optical system 2, a first reflecting mirror 20 which is placed obliquely on the optical axis 17 of the image taking optical system 2 and has the same function as that of the sub-mirror 11 in FIG. 1, a paraxial imaging plane 21 conjugate to the image taking plane 18 formed by the first reflecting mirror 20, a second reflecting mirror 22, an infrared cut filter 23, a stop 24 having two apertures 24-1 and 24-2, a secondary imaging system 25 having two lenses 25-1 and 25-2 placed in correspondence with the two apertures 24-1 and 24-2 of the stop 24, a third reflecting mirror 36, and a photoelectric conversion element (sensor) 26 having two area sensors 26-1 and 26-2. In this case, the first reflecting mirror 20 has a curvature and a converging power (refracting power) that projects the two apertures 24-1 and 24-2 of the stop 24 onto portions near the exit pupil of the image taking optical system 2. A metal film such as aluminum or silver film is formed on the first reflecting mirror 20 by vapor deposition to make only a necessary area reflect light, thus also serving as a field mask for selecting the range in which focus detection is performed. Films are also formed on minimum necessary areas on the second and third reflecting mirrors 22 and 36 by vapor deposition to reduce stray light incident on a photoelectric conversion element. An area of each reflecting mirror which does not function as a reflecting surface is preferably coated with a light-absorbing coating.

Figure 6:
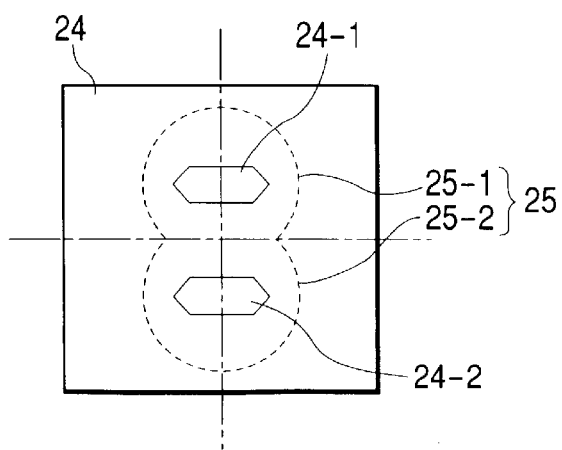
FIG. 6 is a view showing the stop (aperture) of the focus detection means to which the embodiment of the present invention is applied.

FIG. 6 is a plan view of the stop 24 in FIG. 5. The stop 24 has the two horizontally elongated apertures 24-1 and 24-2 arranged side by side in the direction in which the width of each aperture is smaller. The dashed line in FIG. 6 indicates the lenses 25-1 and 25-2 of the secondary imaging system 25 which are located behind the apertures 24-1 and 24-2 of the stop 24.

Figure 2:
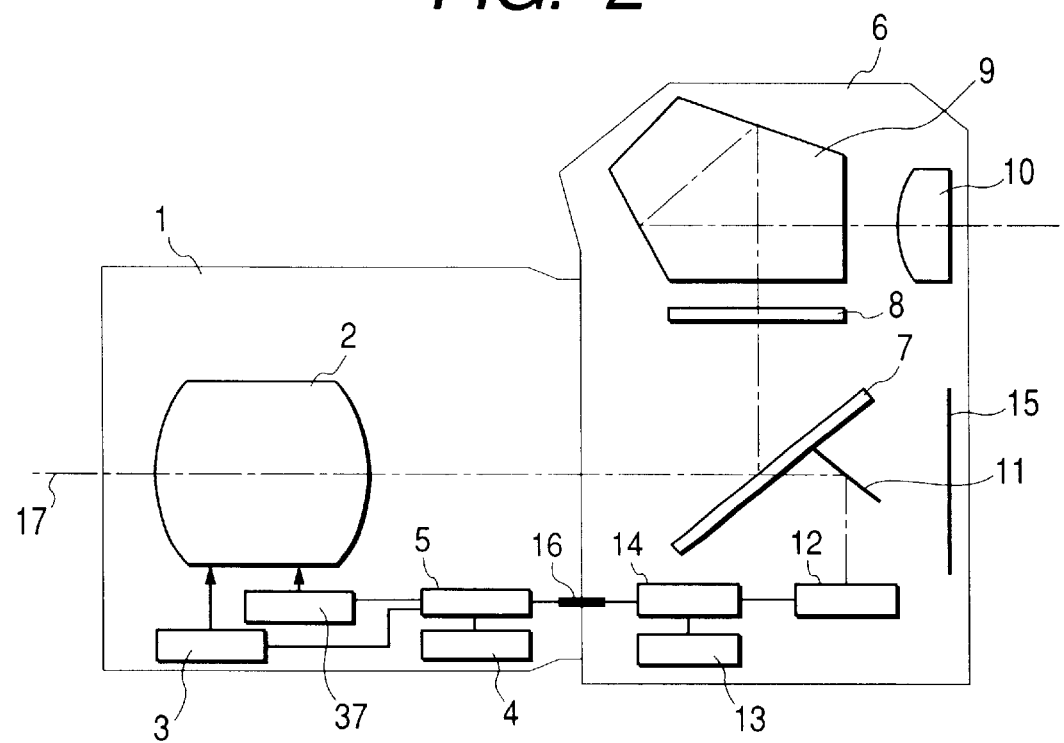
FIG. 2 is a view showing the arrangement of a conventional single-lens reflex camera.
Figure 3:
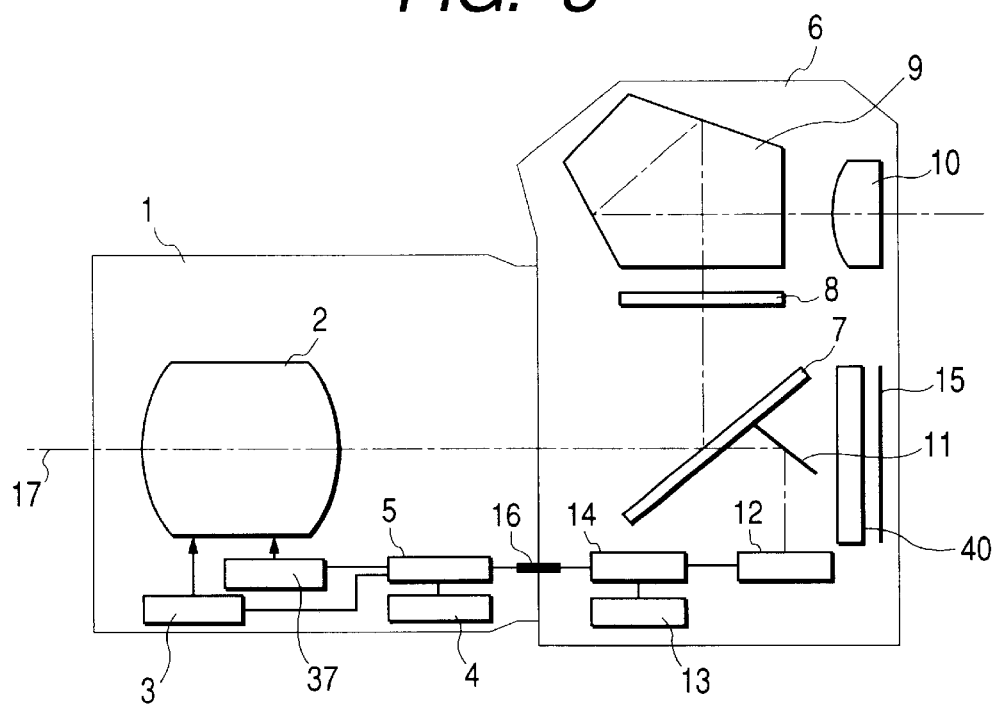
FIG. 3 is a view showing the arrangement of a conventional digital single-lens reflex camera.
Figure 4:
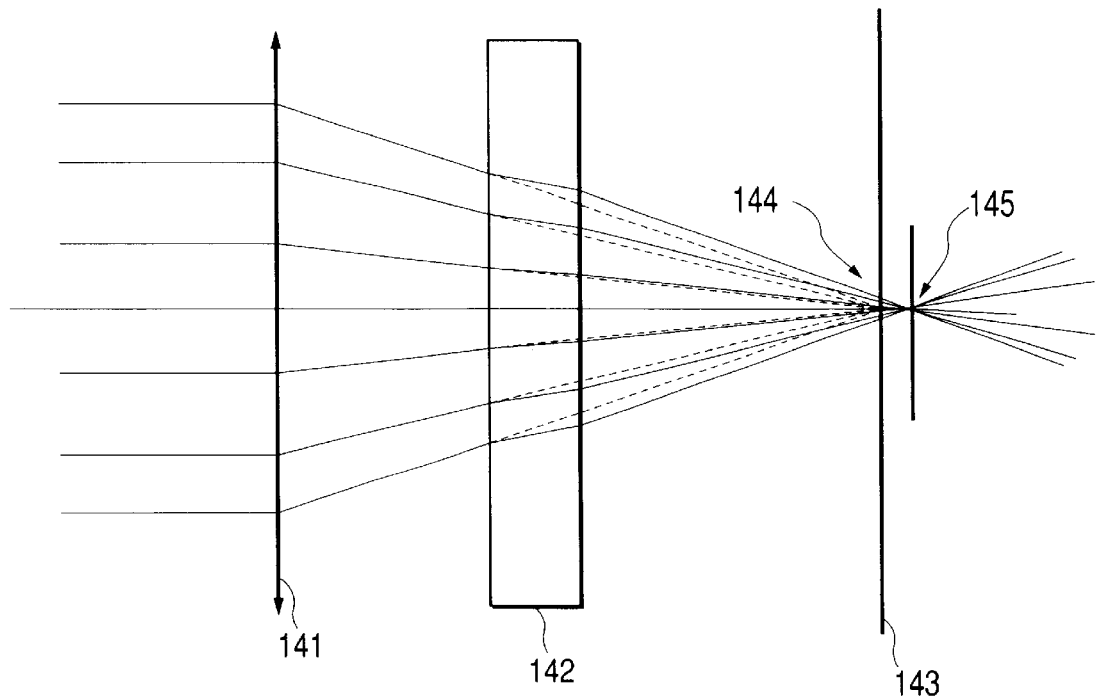
FIG. 4 is a view for explaining a change in best imaging position which is caused when an optical member is placed.
Figure 7:
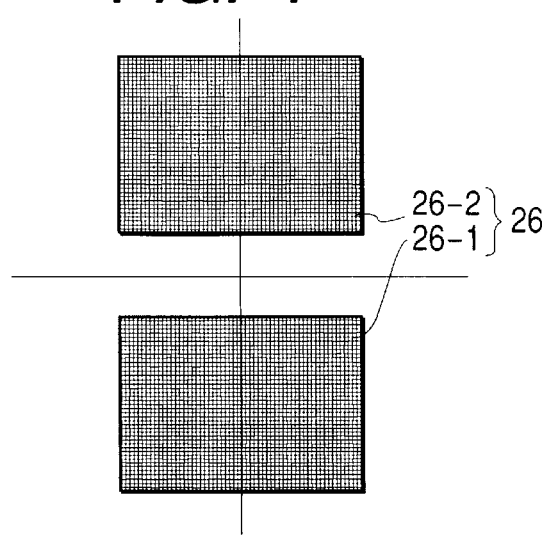
FIG. 7 is a view showing the photoelectric conversion element of the focus detection means to which the embodiment of the present invention is applied.

FIG. 7 is a plan view of the photoelectric conversion element 26 in FIG. 5. As shown in FIG. 7, the two area sensors 26-1 and 26-2 shown in FIG. 2 are two area sensors which have pixels two-dimensionally arranged and are arranged side by side.

In the arrangement shown in FIG. 5 which has the above constituent elements, light beams 27-1 and 27-2 from the image taking lens 2 are transmitted through the half mirror surface of the main mirror 19 first, and then reflected by the first reflecting mirror 20 almost in a direction along the tilt of the main mirror 19. The directions of the light beams are changed by the second reflecting mirror 22, and the light beams are focused by the respective lenses 25-1 and 25-2 of the secondary imaging system 25 through the infrared cut filter 23 and the two apertures 24-1 and 24-2 of the stop 24 to reach the area sensors 26-1 and 26-2 of the photoelectric conversion element 26, respectively, via the third reflecting mirror 36. Referring to FIG. 5, the light beams 27-1 and 27-2 form images on the center of the image taking plane 18. Light beams which form images at other positions also reach the photoelectric conversion element 26 through similar routes, and two light amount distributions associated with object images corresponding to predetermined secondary areas on the image taking plane 18 are formed on the respective area sensors 26-1 and 26-2 of the photoelectric conversion element 26. The focus detection means 12 in FIG. 1 calculates directions in which object images are separated, i.e., the relative positional relationship of the two area sensors 26-1 and 26-2 in the vertical direction in FIG. 7 at positions of area sensors 26-1 and 26-2 respectively, with respect to the light amount distributions associated with the two object images obtained in this manner on the basis of the same detection principle as that of a known focus detection method, thereby detecting the focus state of the image taking lens 1 and outputting the result as a focus deviation amount D.

As described above, if a lens is controlled on the basis of a focus state detection signal associated with a directly obtained focus deviation amount, a proper focus state may be not obtained. For this reason, a correction value unique to each image taking lens is stored in the lens-side storage means 4, and correction is made to match a best imaging position to an image taking plane by using the stored values. In addition, an optical member such as a low-pass filter is interposed between the image taking element and the image taking optical system to prevent moire caused by sampling in the image taking element in the digital camera. Since the above focus detection means cannot correct a change in best imaging position due to these optical members, a proper focus detection state cannot be obtained.

The present invention therefore uses a storage means 41 to store correction data for correcting a change in best imaging position due to the optical members on the camera side, and corrects a change in best imaging position by using the correction data in the storage means 41, thereby driving the image taking optical system on the basis of the correction signal and obtaining a proper focus state.

Figure 8:
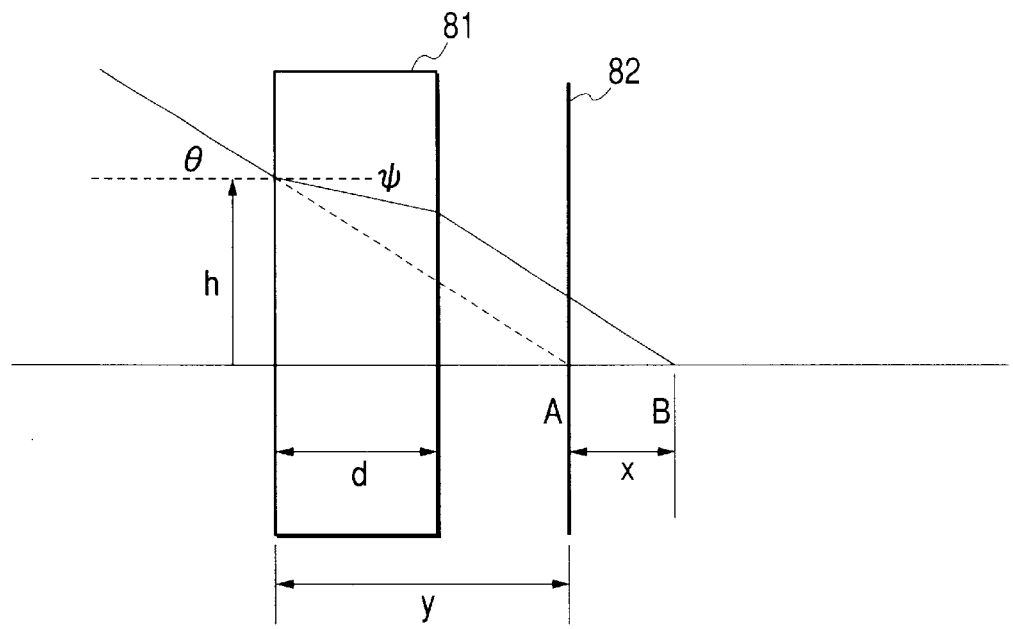
FIG. 8 is a view for explaining a change in the best imaging position of a light beam which forms an on-axis image.

To explain the correction data stored in the storage means 41, a change in best imaging position due to optical members such as a low-pass filter will be described. FIG. 8 is a view showing a ray of light included in a light beam which forms an on-axis image. FIG. 8 shows an optical member (low-pass filter) 81 and image taking plane 82. Without the low-pass filter, a ray of light that forms an on-axis image reaches a point A through the optical path indicted by the dotted line when the image taking optical system is driven on the basis of the best imaging position detected by the focus detection device and the correction data of the best imaging position stored on the lens side so as to match the best imaging position to the image taking plane. When, however, the low-pass filter is inserted in front of the image taking plane, the ray is refracted at the incident and emergence surfaces of the low-pass filter and reaches a point B through the optical path indicated by the solid line. In this manner, a ray of light that forms an image changes due to an optical member such as a low-pass filter. This change amount is given by $$x = d\left(1 - \frac{N\cos\theta}{N^2 - 2\sin^2\frac{\theta}{2}}\right) \quad (2)$$

where x is the amount of change from the best imaging position detected by the focus detection device and the lens correction data, d is the thickness of the optical member, N is the refractive index of the optical member, and θ is the incident angle of a ray of light on the optical member. It is obvious from equation (2) that when an optical member to be used is determined, the change amount x is determined by the incident angle of a ray of light on the optical member. In this case, as is obvious, since the incident angle of a ray included in a light beam incident on the optical member increases as the F-number decreases, and vice versa, the best imaging position at an on-axis focus detection point changes with a change in F-number. In addition, a change in best imaging position may be made by using correction data set for each F-number.

A change in best imaging position due to an optical member at an off-axis focus detection point will be described next.

Figure 9:
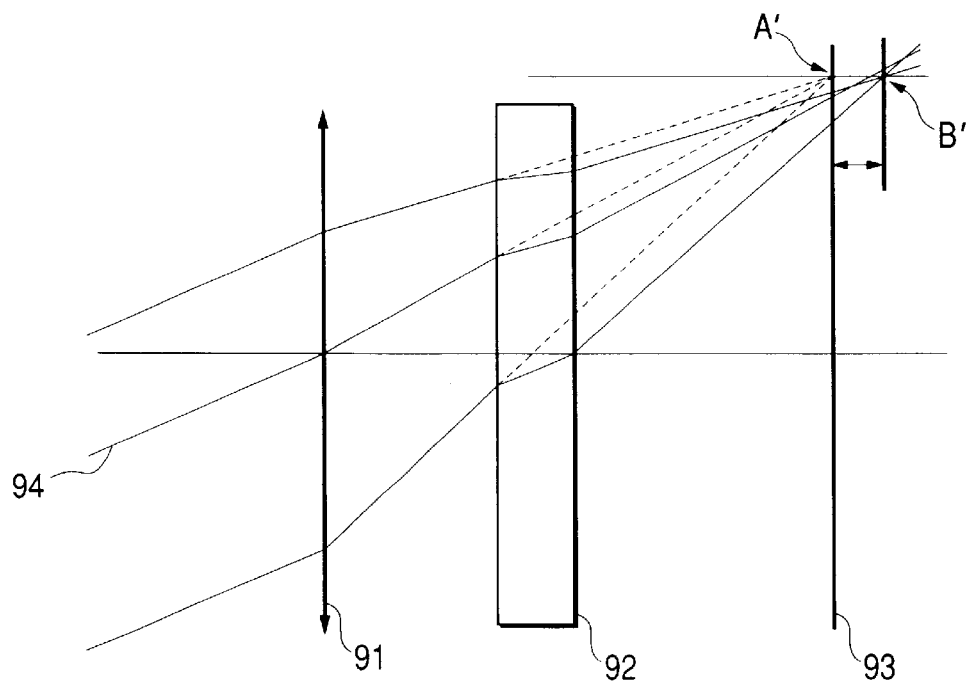
FIG. 9 is a view for explaining a change in the best imaging position of a light beam which forms an off-axis image.

FIG. 9 is a view showing a light beam that forms an image at an off-axis focus detection point. Consider the chief ray of this light beam first. A chief ray 94 crosses the optical axis at an exit pupil position 91, is refracted at the incident and emergence surfaces of the low-pass filter 92, and reaches a point B'. In this case, the change amount of chief ray from a point A at which the chief ray reaches without the optical member is given by equation (2) like the change amount of a ray that forms an on-axis image. Obviously, therefore, the change amount of chief ray depends on the incident angle of the ray on the low-pass filter. In addition, the incident angle θ of this chief ray on the low-pass filter is given by $$\tan\theta = \frac{a}{Z} \quad (3)$$

where a is the distance from an off-axis focus detection point to the optical axis, and z is the distance from the image taking plane 93 to the exit pupil. Since the distance from the off-axis focus detection point to the optical axis is determined by the position of the focus detection point, the incident angle θ of the chief ray on the low-pass filter is determined by the position of the exit pupil of the image taking optical system. Therefore, the deviation amount of the chief ray depends on the position of the exit pupil. In addition, the deviation amount of a ray other than the chief ray of the light beam which forms an image at an off-axis focus detection point is determined by the incident angle of the ray on the low-pass filter as in the above case. However, the incident angles of these rays on the low-pass filter are determined by the incident angle of the chief ray on the low-pass filter and F-number.

As is obvious from the above description, since a change in the best imaging position of a light beam which forms an image on an off-axis focus detection point is determined by the position of the exit pupil and F-number, correction data for each exit pupil position and F-number may be used to correct a change in best imaging position at an off-axis focus detection point.

Examples of correction data in the present invention will be described below.

Figure 10:
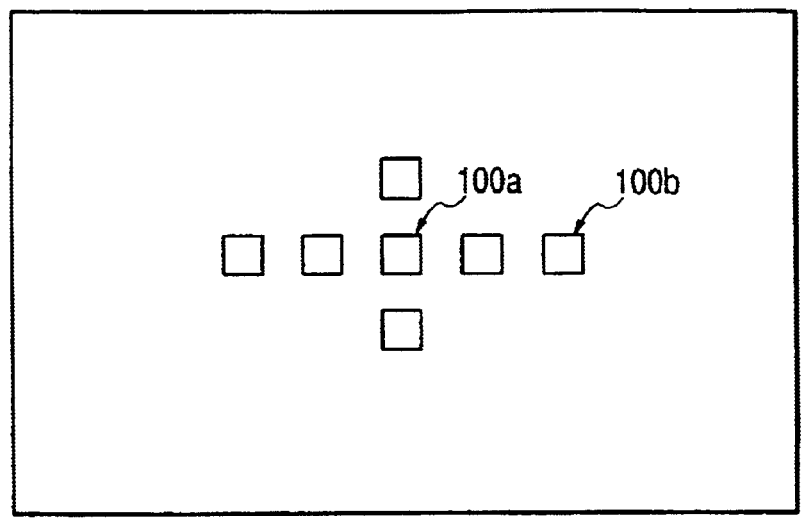
FIG. 10 is a view showing the focus detection point of the focus detection means which is applied to the embodiment of the present invention.
Figure 11:
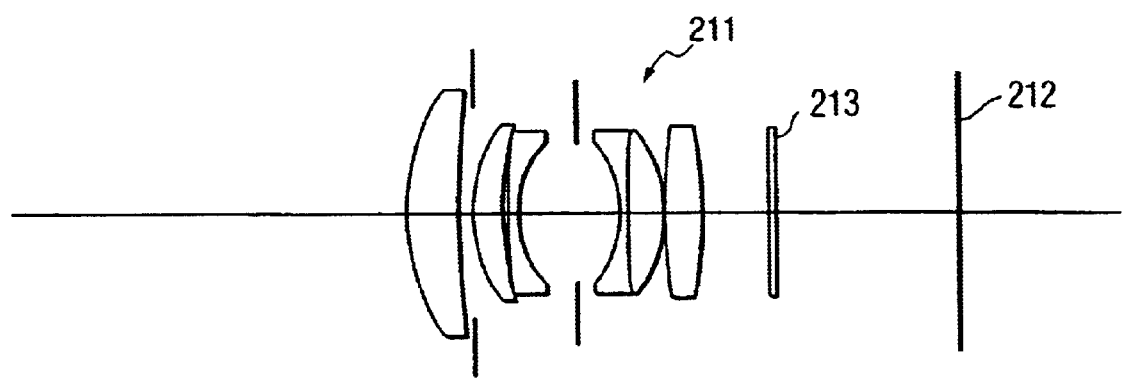
FIG. 11 is a view showing an image taking optical system used to calculate a correction value in the embodiment of the present invention.
Figure 12:
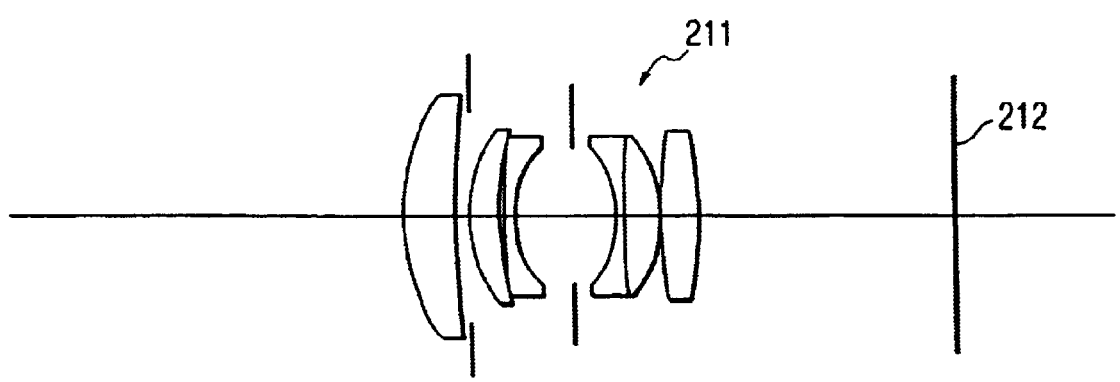
FIG. 12 is a view showing an image taking optical system used to calculate a correction value in the embodiment of the present invention.
Figure 13:
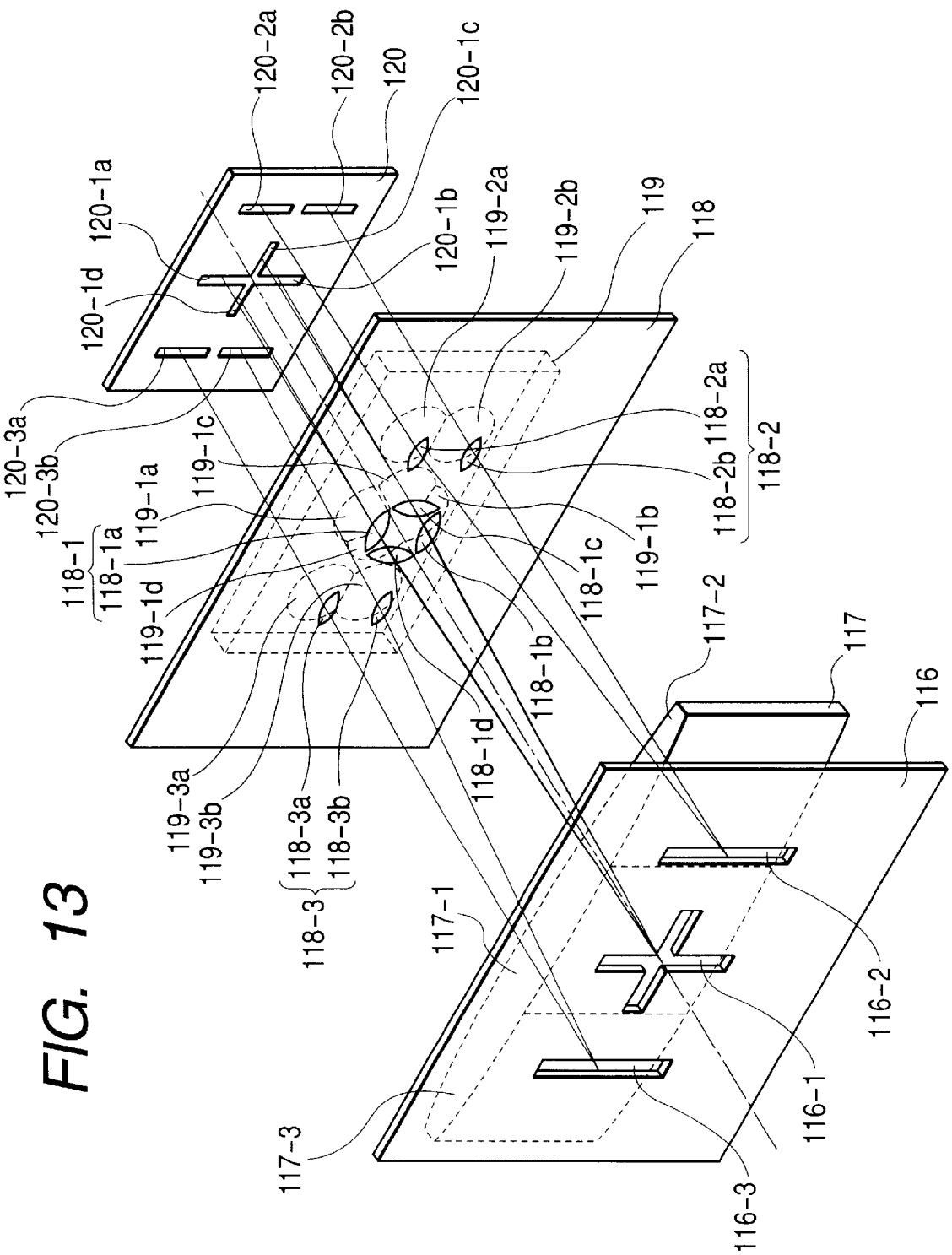
FIG. 13 is a view showing a focus detection device which is applied to the prior art and the embodiment of the present invention.
Figure 14:
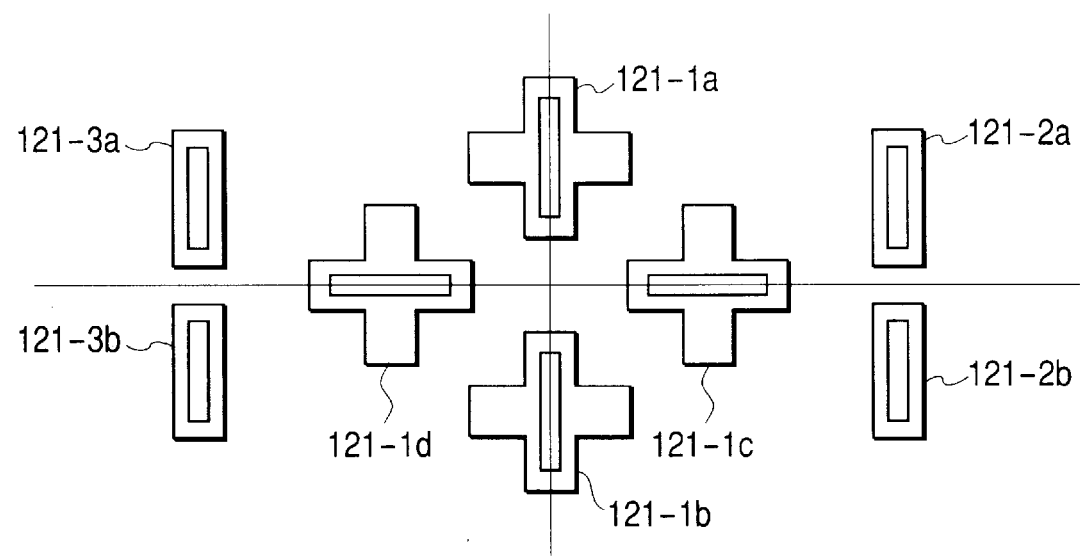
FIG. 14 is a view showing the photoelectric conversion element of the focus detection device which is applied to the prior art and the embodiment of the present invention.

Table 1 is a correction data table for focal positions in the use of an optical system like the one shown in FIG. 11. In this case, Table 1 serving as a data table is a correction data table for correcting a change in best imaging position at a focus detection point, like a focus detection point 100*a*, which is located in the center of a focus detection plane and at which the best imaging position of a light beam which forms an on-axis image is detected in the focus detection device having focus detection points like those in FIG. 10. This correction data table contains data obtained by calculating the differences between best imaging positions (Table 2) without an optical member such as a low-pass filter located between an image taking optical system 211 and an image taking element 212 as shown in FIG. 12 and best imaging positions (Table 3) with an optical member such as a low-pass filter located between the image taking optical system 211 and the image taking element 212 as shown in FIG. 11. In this case, each numerical value in Table 2 and Table 3 represents the distance from the best imaging position to the paraxial image plane (unit:mm).

TABLE 1

| F-number | Correction Amount |
|---|---|
| 1.8 | −0.00648 |
| 2 | −0.00705 |
| 2.8 | −0.00326 |
| 4 | −0.00187 |
| 5.6 | −0.00091 |
| 8 | −0.00044 |
| 11 | −0.00023 |

TABLE 2

| F-number | Best Imaging Position |
|---|---|
| 1.8 | −0.00838 |
| 2 | −0.01503 |
| 2.8 | −0.02717 |
| 4 | −0.01741 |
| 5.6 | −0.01092 |
| 8 | −0.00564 |
| 11 | −0.00307 |

TABLE 3

| F-number | Best Imaging Position |
|---|---|
| 1.8 | −0.0019 |
| 2 | −0.00798 |
| 2.8 | −0.02391 |
| 4 | −0.01554 |

TABLE 3-continued

| F-number | Best Imaging Position |
|---|---|
| 5.6 | −0.01001 |
| 8 | −0.0052 |
| 11 | −0.00284 |

Table 4 is a correction data table for correcting a change in best imaging position at an off-axis focus detection point like a point 100b in FIG. 10. In this case, Table 4 is a correction data table at a focus detection point at a distance of 10 mm from the center of the focus detection plane. All numerical values in the table are expressed in mm, and the exit pupil position represents a distance from the image taking plane. Similar to Table 1, Table 4 contains data obtained by calculating the differences between best imaging positions (Table 5) without an optical member such as a low-pass filter located between the image taking optical system 211 and the image taking element 212 as shown in FIG. 12 and best imaging positions (Table 6) with an optical member 213 such as a low-pass filter located between the image taking optical system 211 and the image taking element 212 as shown in FIG. 11. Tables 7 to 18 show examples of data obtained at different exit pupil positions.

i) Exit Pupil Position 56 mm

TABLE 4

| F-number | Correction Amount |
|---|---|
| F1.8 | −0.01786 |
| F2 | −0.01482 |
| F2.8 | −0.01363 |
| F4 | −0.01362 |
| F5.6 | −0.01231 |
| F8 | −0.01184 |
| F11 | −0.0117 |

TABLE 5 without optical member

| F-number | Best Imaging Position |
|---|---|
| F1.8 | −0.00783 |
| F2 | −0.01057 |
| F2.8 | −0.04663 |
| F4 | −0.05438 |
| F5.6 | −0.06176 |
| F8 | −0.06315 |
| F11 | −0.06341 |

TABLE 6 with optical member

| F-number | Best Imaging Position |
|---|---|
| F1.8 | 0.03003 |
| F2 | 0.00425 |
| F2.8 | −0.033 |
| F4 | −0.04076 |
| F5.6 | −0.04945 |

TABLE 6-continued with optical member

| F-number | Best Imaging Position |
|---|---|
| F8 | −0.05131 |
| F11 | −0.05171 | ii) Exit Pupil Position 117 mm

TABLE 7

| F-number | Correction Amount |
|---|---|
| F1.8 | −0.03741 |
| F2 | −0.03373 |
| F2.8 | −0.01189 |
| F4 | −0.00961 |
| F5.6 | −0.00775 |
| F8 | −0.00682 |
| F11 | −0.00643 |

TABLE 8 without optical member

| F-number | Best Imaging Position |
|---|---|
| F1.8 | −0.06461 |
| F2 | −0.06146 |
| F2.8 | −0.06275 |
| F4 | −0.06316 |
| F5.6 | −0.05545 |
| F8 | −0.04889 |
| F11 | −0.04533 |

TABLE 9 with optical member

| F-number | Best Imaging Position |
|---|---|
| F1.8 | −0.0272 |
| F2 | −0.02773 |
| F2.8 | −0.05086 |
| F4 | −0.05355 |
| F5.6 | −0.0477 |
| F8 | −0.04207 |
| F11 | −0.0389 | ii) Exit Pupil Position 236 mm

TABLE 10

| F-number | Correction Amount |
|---|---|
| F1.8 | −0.02995 |
| F2 | −0.02816 |
| F2.8 | −0.01723 |
| F4 | −0.01018 |
| F5.6 | −0.00662 |
| F8 | −0.00477 |
| F11 | −0.00396 |

TABLE 11 without optical member

| F-number | Best Imaging Position |
|---|---|
| F1.8 | −0.11574 |
| F2 | −0.10949 |
| F2.8 | −0.10913 |
| F4 | −0.08745 |
| F5.6 | −0.06099 |
| F8 | −0.04246 |
| F11 | −0.03301 |

TABLE 12 with optical member

| F-number | Best Imaging Position |
|---|---|
| F1.8 | −0.08579 |
| F2 | −0.08133 |
| F2.8 | −0.0919 |
| F4 | −0.07727 |
| F5.6 | −0.05437 |
| F8 | −0.03769 |
| F11 | −0.02905 | iv) Exit Pupil Position 355 mm

TABLE 13

| F-number | Correction Amount |
|---|---|
| F1.8 | −0.03585 |
| F2 | −0.03261 |
| F2.8 | −0.02357 |
| F4 | −0.01294 |
| F5.6 | −0.0075 |
| F8 | −0.00467 |
| F11 | −0.00344 |

TABLE 14 without optical member

| F-number | Best Imaging Position |
|---|---|
| F1.8 | −0.15951 |
| F2 | −0.15654 |
| F2.8 | −0.16031 |
| F4 | −0.11933 |
| F5.6 | −0.07656 |
| F8 | −0.04723 |
| F11 | −0.03238 |

TABLE 15 with optical member

| F-number | Best Imaging Position |
|---|---|
| F1.8 | −0.12366 |
| F2 | −0.12393 |
| F2.8 | −0.13674 |
| F4 | −0.10639 |
| F5.6 | −0.06906 |

TABLE 15-continued with optical member

| F-number | Best Imaging Position |
|---|---|
| F8 | −0.04256 |
| F11 | −0.02894 | v) Exit Pupil Position 474 mm

TABLE 16

| F-number | Correction Amount |
|---|---|
| F1.8 | −0.05522 |
| F2 | −0.03502 |
| F2.8 | −0.02683 |
| F4 | −0.01589 |
| F5.6 | −0.00881 |
| F8 | −0.00508 |
| F11 | −0.00335 |

TABLE 17 without optical member

| F-number | Best Imaging Position |
|---|---|
| F1.8 | −0.21123 |
| F2 | −0.20961 |
| F2.8 | −0.21034 |
| F4 | −0.15318 |
| F5.6 | −0.09495 |
| F8 | −0.05518 |
| F11 | −0.03504 |

TABLE 18 with optical member

| F-number | Best Imaging Position |
|---|---|
| F1.8 | −0.15601 |
| F2 | −0.17459 |
| F2.8 | −0.18351 |
| F4 | −0.13729 |
| F5.6 | −0.08614 |
| F8 | −0.0501 |
| F11 | −0.03169 |

Figure 15:
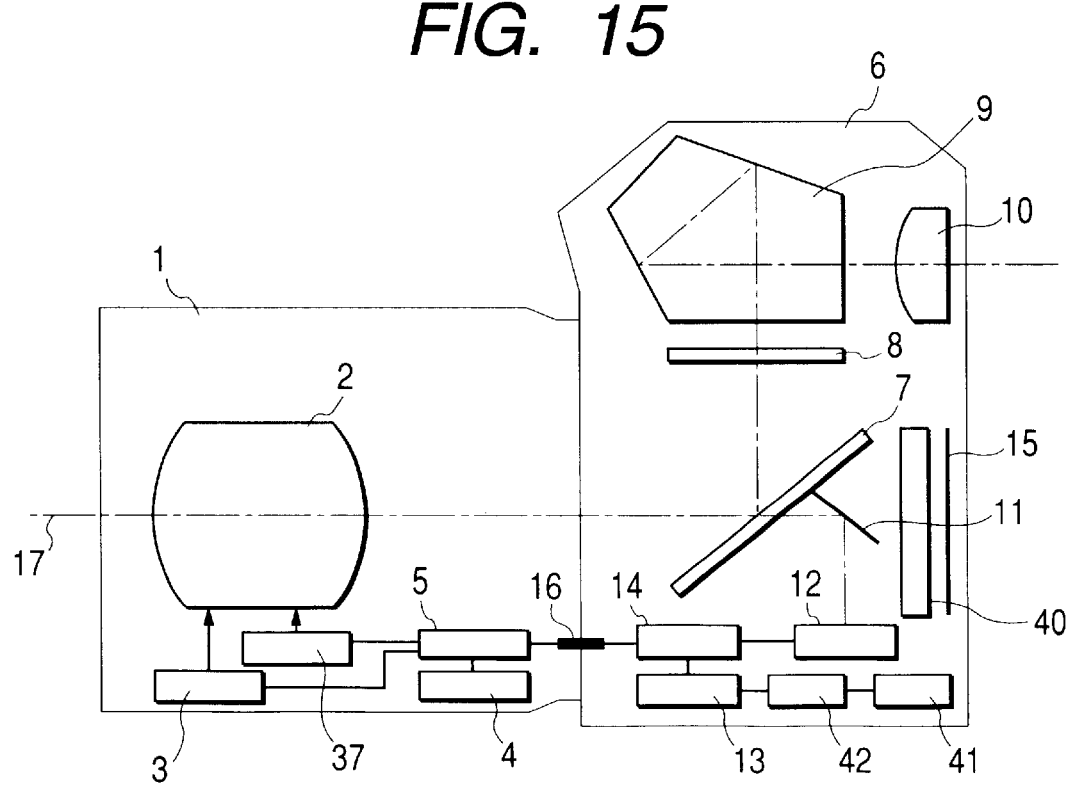
FIG. 15 is a view showing the embodiment of the present invention, which uses a computation means for calculating correction data.

In addition, the above correction data may be provided by approximation functions of the data tables. In this case, as shown in FIG. 15, a computation means 42 is used to calculate correction data from an approximation function for correction, and the amount by which the image taking optical system is driven to obtain a proper focus state is calculated on the basis of the output from the computation means 42. The followings are approximation functions obtained by approximating the above correction tables.

(1) On-axis Focus Detection Point $x = -1.2 \times 10^{-6} F^5 + 2.7 \times 10^{-5} F^4 - 0.000164 F^3 - 0.0004 F^2 + 0.006553 F - 0.01685$ (2) Off-axis Focus Detection Point i) exit pupil position: 56 mm $$x=1.72\times10^{-5}F^5-0.0005F^4+0.005845F^3-0.031F^2+0.0741F-0.08079$$

ii) exit pupil position: 117 mm $$x=3.46\times10^{-5}F^5-0.0011F^4+0.01365F^3-0.081F^2+0.225F-0.254$$

iii) exit pupil position: 236 mm $$x=-8.5\times10^{-7}F^5-9.4\times10^{-7}F^4+0.00045F^3-0.0066F^2+0.036F-0.07651$$

iv) exit pupil position: 355 mm $$x=-7.3\times10^{-6}F^5-0.00021F^4-0.0021F^3-0.007331F^2+0.00214F-0.05325$$

v) exit pupil position: 474 mm $$x=6.16\times10^{-5}F^5-0.0019F^4+0.022F^3-0.1164F^2+0.3022F-0.32469$$

where x is the correction amount for focal position correction, and F is the F-number.

In this case, the above approximation functions are provided as functions of F-numbers. However, functions for correction at off-axis focus detection points may be provided as functions of exit pupil positions.

The following are examples of how correction data for best imaging positions are provided as functions of exit pupil positions.

F1.8

$$x=-2.2\times10^{-13}Z^5+2.9\times10^{-10}Z^4-1.44\times10^{-7}Z^3+3.34\times10^{-5}Z^2-0.00349Z+0.95894$$

F2

$$x=-2.2\times10^{-13}Z^5+2.9\times10^{-10}Z^4-1.44\times10^{-7}Z^3+3.3\times10^{-5}Z^2-0.00343Z+0.096359$$

F2.8

$$x=2.53\times10^{-14}Z^5-3\times10^{-11}Z^4+1.683\times10^{-8}Z^3-4\times10^{-6}Z^2-0.000431Z-0.02763$$

F4

$$x=2.58\times10^{14}Z^5-3\times10^{11}Z^4+1.69\times10^{-8}Z^3-4\times10^{-6}Z^2-0.000461Z-0.02944$$

F5.6

$$x=2.19\times10^{-14}Z^5-3\times10^{-11}Z^4+1.465\times10^{-8}Z^3-3.55\times10^{-6}Z^2+0.000424Z-0.02725$$

F8

$$x=2.06\times10^{-14}Z^5-3\times10^{-12}Z^4+1.395\times10^{-8}Z^3-3.4\times10^{-6}Z^2-0.00042Z-0.02688$$

F11

$$x=2.09\times10^{-14}Z^5-3\times10^{-11}Z^4+1.42\times10^{-8}Z^3-3.46\times10^{-6}Z^2+0.000428Z-0.0271$$

where x is the correction amount for focal position correction, and Z is the exit pupil position, i.e., the distance from the image taking plane.

Figure 16A:
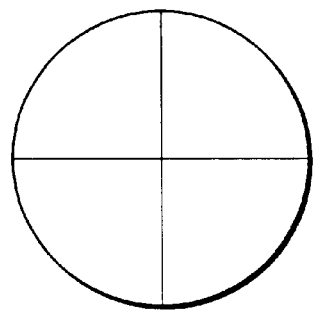
FIGS. 16A and 16B are views each showing the pupil shape of a lens.
Figure 16B:
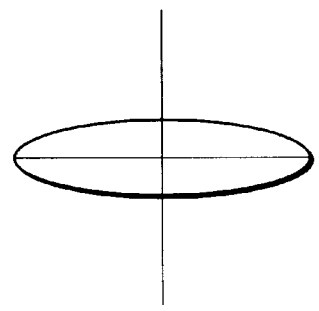

As described above, the correction data for the off-axis focus detection points are data set for the respective exit pupil positions and F-numbers. Strictly speaking, as shown in FIG. 16A and 16B, the divergence of a light beam which forms an image at an off-axis focus detection point is determined by exit pupils, but the exit pupils are not point-symmetrical. For this reason, it is preferable to use data representing the shapes of exit pupils as parameters for correction data rather than setting data for each F-number. For example, the divergence of exit pupils in at least two directions with respect to the chief ray are used as parameters for correction data.

According to the present invention, as described above, a focus detection error caused by an optical member such as a low-pass filter placed between the image taking optical system and the image taking element, i.e., a focal position deviation caused by the optical member, can be properly corrected by making the camera side have data for correcting a focal position deviation caused by the optical member, thereby detecting a proper focus state.

What is claimed is:

1. A camera system including a lens barrel having an image taking optical system and a camera capable of interchanging the lens barrel with another lens barrel, said image taking optical system having a movable lens moving in an optical axis direction for focus adjustment, said camera system comprising:

an image taking element including an image taking plane for receiving a light beam from said image taking optical system;

a focus state detection element placed at a position folded from the optical axis of said image taking optical system, said focus state detection element comprising a detecting plane optically equivalent to said image taking plane of said image taking element, said focus state detection element detecting a focus state of said image taking optical system with respect to a predetermined area on said detecting plane;

a filter member placed on the optical axis of said image taking optical system and between said image taking element and said image taking optical system;

first storage means for storing correction data for correcting a change of an imaging position caused by said filter member; and control means for controlling a movement of said movable lens for said focus adjustment on the basis of said correction data stored in said first storage means and information relating to said focus state detected by said focus state detection element.

2. A camera system according to claim 1, wherein said lens barrel comprises second storage means for storing best imaging position correction data unique to said image taking optical system, and wherein said control means controls said movement of said movable lens for said focus adjustment on the basis of said best imaging position correction data stored in said second storage means, said correction data stored in said first storage means, and said information relating to said focus state.

3. A camera system according to claim 1, wherein said correction data stored in said first storage means includes correction data for each F-number of said image taking optical system.

4. A camera system according to claim 1, wherein said correction data stored in said first storage means includes a function of an F-number of said image taking optical system, and wherein said control means controls said movement of said movable lens for said focus adjustment on the basis of said function, data representing said F-number of said image taking optical system, and said information relating to said focus state.

5. A camera system according to claim 1, wherein said focus state detection element detects said focus state of said image taking optical system with respect to a plurality of areas on said detecting plane.

6. A camera system according to claim 1, further comprising a light beam splitting element placed between said image taking element and said image taking optical system, for splitting said light beam from said image taking optical system to provide a first state for directing the light beam to said focus state detection element and a second state for directing the light beam to said image taking plane, wherein said filter member is placed between said image taking element and said light beam splitting element.

7. A camera having an interchangeable lens barrel with an image taking optical system, said image taking optical system having a movable lens moving in an optical axis direction for focus adjustment, said camera comprising:

an image taking element including an image taking plane for receiving a light beam from said image taking optical system;

a focus state detection element placed at a position folded from the optical axis of said image taking optical system, said focus state detection element comprising a detecting plane optically equivalent to said image taking plane of said image taking element, said focus state detection element detecting a focus state of said image taking optical system with respect to a predetermined area on said detecting plane;

a filter member placed on the optical axis of said image taking optical system and between said image taking element and said image taking optical system;

first storage means for storing correction data for correcting a change of an imaging position caused by said filter member; and control means for controlling a movement of said movable lens for said focus adjustment on the basis of said correction data stored in said first storage means and information relating to said focus state detected by said focus state detection element.

8. A camera system according to claim 7, wherein the lens barrel comprises second storage means for storing best imaging position correction data unique to said image taking optical system, and wherein said control means controls said movement of said movable lens for said focus adjustment on the basis of said best imaging position correction data stored in said second storage means, said correction data stored in said first storage means, and said information relating to said focus state.

9. A camera system according to claim 7, wherein said correction data stored in said first storage means includes correction data for each exit pupil position and each F-number of said image taking optical system.

10. A camera system according to claim 7, wherein said correction data stored in said first storage means includes of a function of an F-number of said image taking optical system and/or of an exit pupil position of said image taking optical system, and wherein said control means controls said movement of said movable lens for said focus adjustment on the basis of said function, data representing said F-number of said image taking optical system and/or said exit pupil position, and said information relating to said focus state.

11. A camera according to claim 7, wherein said focus state detection element detects said focus state of said image taking optical system with respect to a plurality of areas on said detecting plane.

12. A camera according to claim 7, further comprising a light beam splitting element placed between said image taking element and said image taking optical system, for splitting said light beam from said image taking optical system to provide a first state for directing the light beam to said focus state detection element and a second state for directing the light beam to said image taking plane, wherein said filter member is placed between said image taking element and said light beam splitting element.

13. An image taking apparatus comprising:

an image taking optical system including a movable lens moving in an optical axis direction for focus adjustment;

an image taking element including an image taking plane for receiving a light beam from said image taking optical system;

a focus state detection element placed at a position folded from the optical axis of said image taking optical system, said focus state detection element comprising a detecting plane optically equivalent to said image taking plane of said image taking element;

a light beam splitting element placed between said image taking element and said image taking optical system, for splitting said light beam from said image taking optical system to provide a first state for directing the light beam to said focus state detection element and a second state for directing the light beam to said image taking plane;

a filter member placed between said image taking element and said light beam splitting element;

first storage means for storing correction data for correcting a change of an imaging position caused by said filter member; and control means for controlling a movement of said movable lens for said focus adjustment on the basis of said correction data stored in said first storage means and information relating to said focus state detected by said focus state detection element.

14. An image taking apparatus according to claim 13, wherein said correction data stored in said first storage means includes correction data for each F-number of said image taking optical system.

15. An image taking apparatus according to claim 13, wherein said correction data stored in said first storage means includes data of a function of each F-number of said image taking optical system, and wherein said control means controls the movement of said movable lens for said focus adjustment on the basis of data representing said function and the F-number of said image taking optical system and the information relating to said focus state.

16. An image taking apparatus comprising:

an image taking optical system having a movable lens moving in an optical axis direction for focus adjustment;

an image taking element including an image taking plane for receiving a light beam from said image taking optical system;

a focus state detection element placed at a position folded from the optical axis of said image taking optical system, said focus state detection element comprising a detecting plane optically equivalent to said image taking plane of said image taking element;

a filter member placed on said optical axis of said image taking optical system and between said image taking element and said image taking optical system;

first storage means for storing correction data for correcting a change of an imaging position caused by said filter member; and control means for controlling a movement of said movable lens for said focus adjustment on the basis of said correction data stored in said first storage means and information relating to said focus state detected by said focus state detection element.

17. An image taking apparatus according to claim 16, wherein said correction data stored in said first storage means includes correction data for each F-number of said image taking optical system.

18. An image taking apparatus according to claim 16, wherein said correction data stored in said first storage means includes data of a function of each F-number of said image taking optical system, and wherein said control means controls the movement of said movable lens for said focus adjustment on the basis of data representing said function and the F-number of said image taking optical system and the information relating to said focus state.

19. A camera to which an exchangeable lens is detachably attached, said camera comprising:

an image taking element for receiving light from said lens;

a focus state detection unit for receiving a portion of the light, which is reflected by a reflection member;

a filter placed between the reflection member and said image taking element;

a memory for storing correction data for correcting a change of an imaging position caused by said filter; and a control unit for correcting an output of said focus state detection unit in accordance with said correction data.

20. A camera comprising:

an image taking element;

a focus state detection unit;

a mirror for reflecting a portion of light from an optical system to said focus state detection unit;

a filter placed between said mirror and said image taking element; and a memory for storing correction data used for correcting a detection error of said focus state detection device caused by said filter.

21. A camera according to claim 20, wherein said correction data is one of (a) a data table that provides a correction amount in accordance with an F-number and (b) a function that provides a correction amount in accordance with an F-number.

22. A camera to which an exchangeable lens is detachably attached, said camera comprising:

an image taking element for receiving light from said lens;

a quick return mirror for reflecting a portion of the light to a finder;

a focus state detection unit;

a sub-mirror placed between said quick return mirror and said image taking element, said sub-mirror reflecting another portion of the light to said focus state detection unit;

a low pass filter placed between said sub-mirror and said image taking element;

a memory for storing correction data for correcting a change of an imaging position of the light caused by said low pass filter; and a control unit for correcting an output of said focus state detection unit in accordance with said correction data.

* * * * *

UNITED STATES PATENT AND TRADEMARK OFFICE
CERTIFICATE OF CORRECTION

PATENT NO. : 6,813,442 B2
DATED : November 2, 2004
INVENTOR(S) : Takaho Matsuda

It is certified that error appears in the above-identified patent and that said Letters Patent is hereby corrected as shown below:

Column 3,
Line 19, "moire" should read -- moiré --.

Column 6,
Line 50, "moire" should read -- moiré --.

Column 9,
Line 62, Table 6, "0.03003" should read -- 0.01003 --.

Column 12,
Line 60, "followings" should read -- following --.

Column 13,
Line 35, "0.95894" should read -- 0.095894 --.
Line 48, "$10^{14}$" should read -- $10^{-14}$ -- and "$10^{11}$" should read -- $10^{-11}$ --.

Column 15,
Line 58, "includes of" should read -- includes --.

Signed and Sealed this

Fifteenth Day of March, 2005

JON W. DUDAS
*Director of the United States Patent and Trademark Office*